Figure 2:
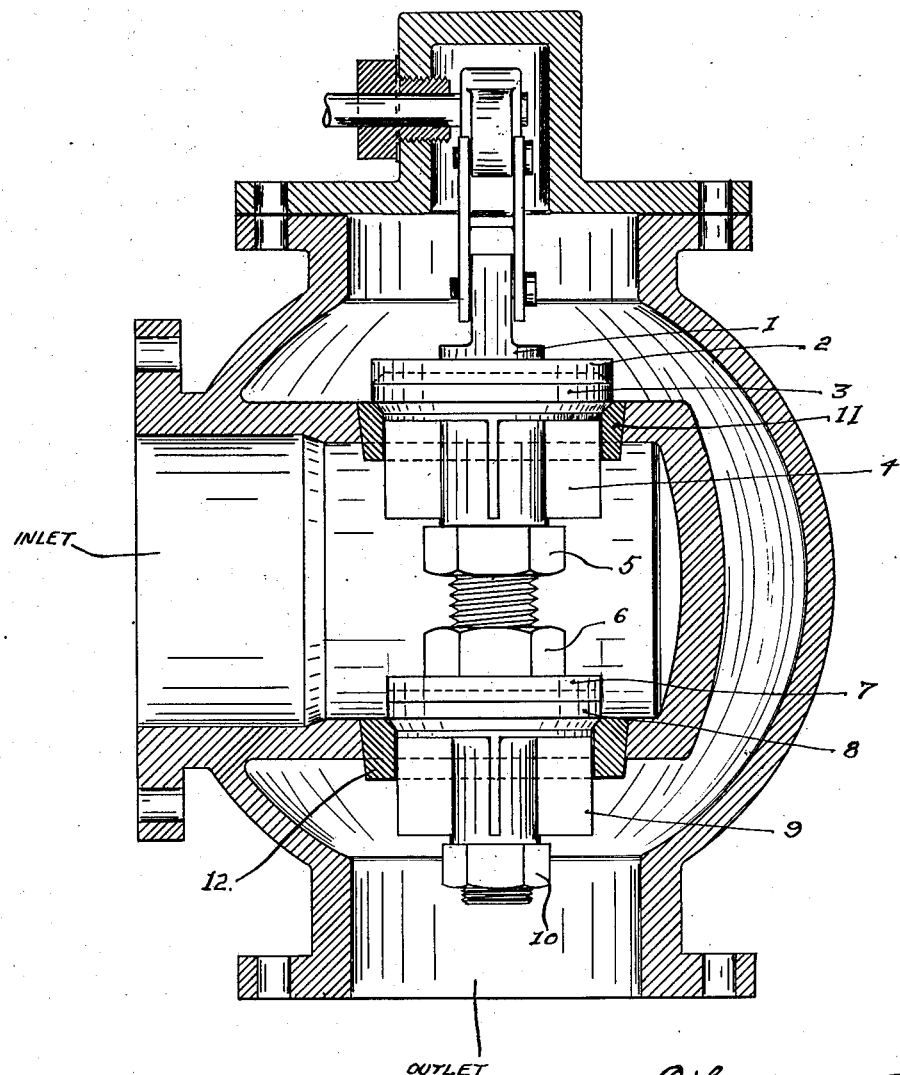

March 19, 1935.　　　C. E. PAINTER　　　1,994,660
OIL AND GAS SEPARATOR VALVE
Filed Dec. 3, 1932　　　2 Sheets-Sheet 1
FIG. 1.　　　FIG. 3.　　　FIG. 5.
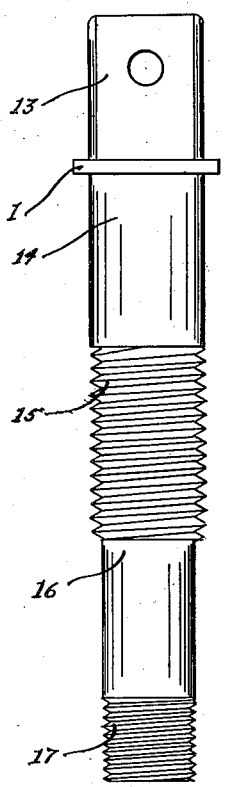
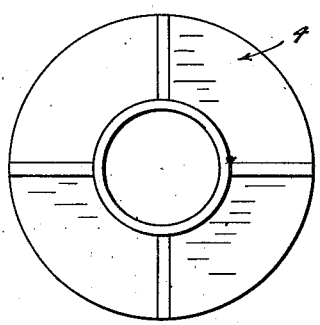
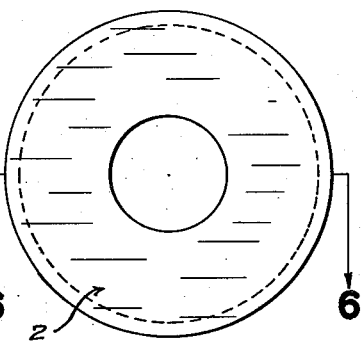
FIG. 4.　　　FIG. 6.
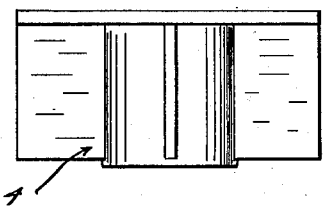
FIG. 9.
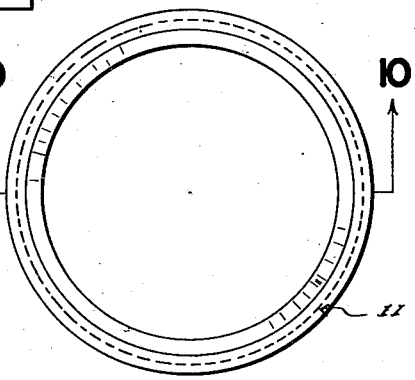
FIG. 7.
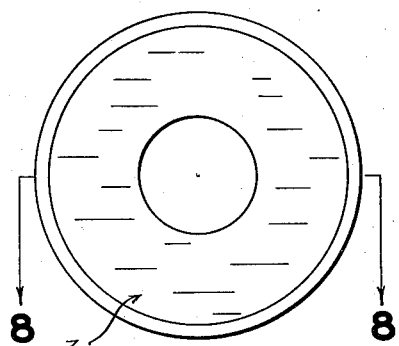
FIG. 10.
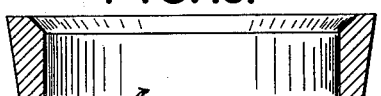
Charles E. Painter
INVENTOR.
FIG. 8.
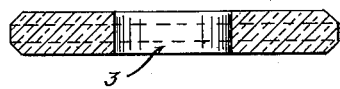

Patented Mar. 19, 1935

1,994,660

UNITED STATES PATENT OFFICE 1,994,660

OIL AND GAS SEPARATOR VALVE

Charles E. Painter, Oklahoma City, Okla.

Application December 3, 1932, Serial No. 645,615

1 Claim. (Cl. 251—82)

This invention relates to an oil and gas separator valve. It is understood that oil and gas separator valves have two valves, and previously both valves were cast into one contiguous piece of metal, and when the facings of the valves became worn, it was necessary to remove the entire valve housing or drum from the pipe line and convey it to the machine shops to have the valve facings built up with new metal and then ground into place again, which necessarily involved a great deal of time, labor, and expense.

The object of my invention is:

1. To provide a mandrel or shaft upon which the valve discs may be removed or replaced without removing the valve housing or drum from the pipe line.

2. A further object is to provide a removable disc, having a beveled rim, fitted upon the mandrel to cover and support the valve disc.

3. A further object is to provide a valve disc which may be composed of any material, but preferably live rubber, in order to absorb any small particles which may accumulate on the face of the valve disc and otherwise prevent it from closing, with a beveled edge so that it may be removed and inverted in order that the unused side or surface of the disc may be made to serve as a new disc face.

4. A further object is to provide an adjustable lower valve which may be adjusted on the mandrel or shaft in order that both valves may be made to close exactly at the same time, and to eliminate the necessity of grinding one valve down in order that the other may be closed.

5. A further object is to provide a mandrel or shaft separate from the valve discs and guides but upon which they may be assembled, adjusted, and held in place by threads on the shaft for a lock nut below the upper valve disc, and above the lower valve disc, with threads beneath the lower valve guide for a lock nut to hold the valve disc and guide in place.

6. A further object is to provide removable valve seats, frustrum shaped, which may be fitted into the wall or frame of the valve housing by pressure and which may be removed and replaced. The function of these valve seats is to provide a surface for the valve discs to close upon, separate from the valve body or housing.

In the accompanying drawings, Figure I is a view of the mandrel or shaft in a vertical position. No. 1 is the fixed collar supporting the disc or protector for the upper valve disc. No. 13 is a side view of the flat end of the mandrel with an opening in the center of sufficient size for a small bolt. No. 14 is the smooth part of the mandrel upon which the upper valve disc and guide is placed. No. 15 is the threaded part of the mandrel for the lock nut supporting the upper valve disc, and guide, and the adjustable lock nut abutting the top side of the lower disc. No. 16 is the smooth part of the mandrel upon which the lower valve, disc, and guide is placed. No. 17 is the threaded part of the mandrel supporting the lower adjustable lock nut which holds the lower valve, disc, and guide in place.

Figure II is a vertical sectional view through center of valve with all parts in place, and shown in closed position. No. 1 is the fixed collar supporting the disc or protector for the upper valve disc. No. 2 is the disc having a beveled rim supporting and protecting the top side of the upper valve disc. No. 3 is the removable and invertible upper valve disc. No. 4 is the removable guide supporting the upper valve disc and serves as a guide to keep the valve in the center of the opening. No. 5 is a lock nut supporting the upper valve disc, and guide. No. 6 is the adjustable lock nut abutting the top side of the lower disc. No. 7 is the valve disc having a beveled rim supporting and protecting the upper side of the disc of the lower opening. No. 8 is the removable and invertible lower valve disc. No. 9 is the removable guide supporting the lower valve disc and serves as a guide to keep the assembled valve in the center of the opening. No. 10 is the adjustable lock nut which holds the lower valve, disc, and guide in place. No. 11 is the removable upper frustrum shaped valve seat fitted into the frame or the wall of the valve housing or drum. No. 12 is the removable lower frustrum shaped valve seat fitted into the frame or the wall of the valve housing or drum.

Figure III is an end view of the guide composed of four fins attached at right angles to the disc with an opening in the center of sufficient size to fit upon the valve mandrel.

Figure IV is a side view of the guide.

Figure V is a plan view of the disc having a beveled rim.

Figure VI is a vertical section through center of Figure 5.

Figure VII is a plan view of the valve disc.

Figure VIII is a vertical sectional view of Figure 7.

Figure IX is an end view of one of the removable frustrum shaped valve seats.

Figure X is a vertical sectional view of Figure 9.

I claim:

In an oil and gas separator valve, a valve body having an inlet and an outlet and a partition separating the inlet and outlet and having upper and lower aligned openings; a mandrel or shaft composed of metal with a fixed collar at its upper end when in a vertical position, the mandrel being of the same dimensions from beneath the collar for approximately two-thirds its length, the lower portion of the mandrel of this dimension being threaded for a lock nut, the lower one-third of the mandrel being of a slightly lesser dimension than the upper two-thirds, the lower end being threaded for a lock nut; a removable disc having a beveled rim on one side and with an opening in the center of sufficient size to fit upon the mandrel underneath the collar, with the beveled rim side toward the smaller end of the mandrel; a removable and invertible valve, disc-like in shape with beveled edges and a bored center suitable to be placed upon the mandrel next to the said disc; a removable guide composed of a metal disc having a central body and four webs or fins arranged at right angles to the disc at equal distances apart with an opening in the center of said body of sufficient size to fit upon the mandrel underneath the valve; a lock nut fitted upon the mandrel underneath the guide to hold it and the valve in place; an adjustable lock nut suitable for the upper threaded part of the mandrel to abut the top of the lower disc; a removable disc identical with the one described above except slightly smaller in circumference with the opening in the center reduced to fit upon the diminished portion of the mandrel; a removable and invertible valve identical to the one described above except slightly smaller in circumference with the opening in the center reduced to fit upon the diminished portion of the mandrel underneath said disc; a removable guide similar to the one described above except slightly reduced in circumference with the opening in the center reduced to fit upon the diminished portion of the mandrel underneath the valve; an adjustable lock nut suitable in size to be screwed on the lower end of the mandrel to hold the lower guide, valve, and disc in place; and removable frustrum shaped valve seats fitted into the openings in said partitions.

CHARLES E. PAINTER.